F. A. HEADSON.
NUT LOCK.
APPLICATION FILED JUNE 25, 1906.

943,826.

Patented Dec. 21, 1909.

Witnesses:

Inventor:
Frank A. Headson,
By Thomas F. Sheridan,
Atty.

UNITED STATES PATENT OFFICE.

FRANK A. HEADSON, OF LA FAYETTE, INDIANA.

NUT-LOCK.

943,826.  Specification of Letters Patent.  Patented Dec. 21, 1909.

Application filed June 25, 1906. Serial No. 323,280.

*To all whom it may concern:*

Be it known that I, FRANK A. HEADSON, a citizen of the United States, residing at La Fayette, in the county of Tippecanoe and State of Indiana, have invented certain new and useful Improvements in Nut-Locks, of which the following is a specification.

My invention relates to nut locks; and has for its object to provide an improved device of this sort, and is of great simplicity of construction and use in operation.

My invention consists in the combinations and details hereinafter set forth and claimed.

Figure 1:
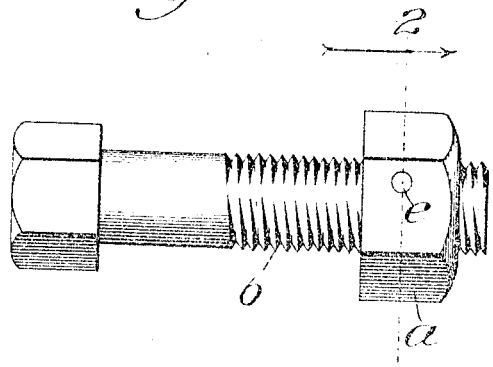
Figure 2:
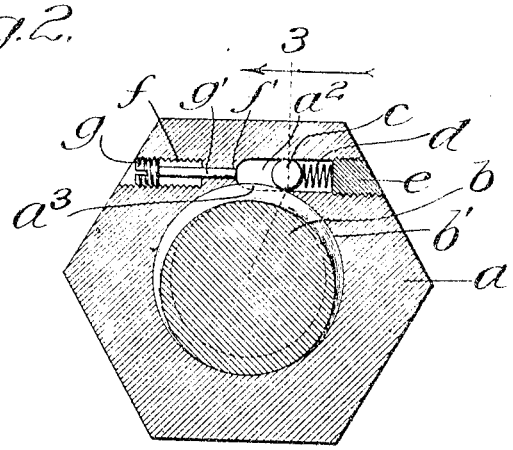
Figure 3:
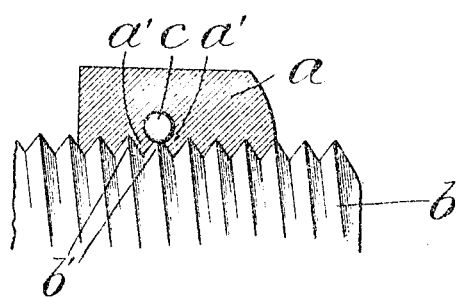

In the accompanying drawings—Figure 1 is a side elevation of a bolt and nut with my improvements applied thereto; Fig. 2 is a transverse section on the line 2 of Fig. 1. Fig. 3 is a longitudinal section on the line 3 of Fig. 2.

In the drawings $a$ represents a screw threaded nut and $b$ a screw threaded bolt of the ordinary type. I provide the nut with a transverse recess $a^2$ and also with a transverse recess $f$ in alinement therewith, the recess $a^2$ and $f$ being connected by a passageway $f'$. The recess $a^2$ is of such size as to intercept the channel between adjacent threads of the nut, thus forming a slight opening between two of the adjacent threads $a'$, in which opening the apex of the thread on the bolt is received, as indicated in Figs. 2 and 3. The portion of the apex of the thread $b'$ on the bolt which projects into the opening between two adjacent threads $a'$ of the nut is designated on Fig. 2 by the reference character $a^3$. Within the recess $a^2$ I provide a locking device, shown as a ball $c$, which is pressed toward the inner end of the opening by the spring $d$, a retaining plug $e$ being screwed into the end of the opening, which is screw threaded for this purpose, as will be readily understood.

When the nut is first screwed in position on the bolt, it may be turned down thereon to the desired extent. If however, any attempt is made to unscrew the thread on the bolt, the ball $c$, being forced against the thread of the bolt in a direction opposite to the direction in which the nut is turned, will ride up over the thread and be firmly wedged between the thread and the top of the recess, thus preventing the turning of the nut.

In order to provide a means for releasing the nut, in order that it may be taken off, I provide a screw threaded plug $g$ having a reduced portion $g'$ which passes through the connecting passageway $f'$ between the recesses $f$ and $a^2$. By turning the screw threaded plug, the stem $g'$ will be forced against the ball $c$ forcing it out of engagement of the bolt against the force of the spring $d$.

The operation of my device will be readily understood without further description.

I claim:

In a device of the class described, a bolt, a nut thereon having a recess extending transversely through one side of it, an intermediate part of said recess being contracted and the recess on one side of the contracted portion intercepting the channel between adjacent threads of the nut, a ball in the same part of the recess, a screw plug in the end of the same recess, a coil spring between the plug and the ball, a screw plug in the opposite end of the recess, and a stem therefrom projecting through the contracted portion of the recess.

FRANK A. HEADSON.

Witnesses:
NORMAN A. STREET,
W. T. JONES.